US006667866B1

(12) United States Patent
LaPlace et al.

(10) Patent No.: US 6,667,866 B1
(45) Date of Patent: Dec. 23, 2003

(54) VIRTUAL GROUND FOLLOWING SINGLE-PHASE TRIP

(75) Inventors: Carl J. LaPlace, Raleigh, NC (US); David G. Hart, Raleigh, NC (US); William M. Egolf, Apex, NC (US); Graeme N. McClure, Highett Victoria (AU)

(73) Assignee: ABB Technology AG, Zurich (CH)

( * ) Notice: Subject to any disclaimer, the term of this patent is extended or adjusted under 35 U.S.C. 154(b) by 387 days.

(21) Appl. No.: 09/749,973

(22) Filed: Dec. 28, 2000

(51) Int. Cl.[7] ................................................. H02H 3/42
(52) U.S. Cl. ............................. 361/87; 361/42; 361/71
(58) Field of Search ............................. 361/87, 78, 94, 361/2, 7, 42, 44, 71

(56) References Cited

U.S. PATENT DOCUMENTS

| 4,642,564 A | | 2/1987 | Hurley ........................ 324/132 |
| 5,768,079 A | * | 6/1998 | Buell ............................ 361/78 |

* cited by examiner

Primary Examiner—Brian Sircus
Assistant Examiner—James A Demakis
(74) Attorney, Agent, or Firm—Woodcock Washburn LLP (57) ABSTRACT

A three phase trip of a power line is prevented in a power distribution network delivering electrical power through multiple current carrying conductors and a neutral/ground line. The three phase trip is prevented after a change in the current in the neutral/ground line caused by a partial trip of a recloser. A partial trip is detected in the power distribution network, and then a threshold current is automatically adjusted from a first level to a second level for the neutral/ground line.

18 Claims, 6 Drawing Sheets

VIRTUAL GROUND FOLLOWING SINGLE-PHASE TRIP

FIELD OF THE INVENTION

The invention relates generally to electrical power distribution components. More particularly, the invention relates to automatic reclosers.

BACKGROUND OF THE INVENTION

The basic functions of an electrical power system are to continuously maintain an adequate and reliable supply of electric power to customers. However, performing these functions is not always possible because various types of failures occur randomly and beyond the control of system engineers. Power system planners, designers, and operators are generally concerned with the reliability of their systems and the determination of realistic availability targets for their systems. Recently, this concern has been accentuated by the introduction of competition in the marketplace among utility companies. Now, utility companies are jockeying among themselves to provide distinguishable services in an effort to sustain existing customers and to attract new customers.

As a result, power system operators are constantly developing improved components for power distribution systems that will enhance the system's reliability. For example, many power utilities around the world use fuses on their lateral lines. In addition to fuses, utilities may employ an automatic power restoration device or recloser. A recloser is used in an electrical distribution system to protect high voltage power lines by minimizing power distribution interruptions caused by transients or faults.

In operation, a recloser acts as an intelligent circuit breaker. In this sense, a recloser opens or trips a circuit when a certain event occurs; usually this event is the appearance of current, voltage, and/or frequency in a line. In one sense, when the recloser detects an overcurrent, i.e., current exceeding a predetermined threshold, the recloser will trip. The recloser serves to isolate the faulted portions of the line by opening that portion. The recloser then closes the open portion of the circuit after a predetermined period of time, usually when the appearance of current, voltage, and/or frequency disappears.

A recloser control device, which can be an electronic control circuit, operates a recloser. A recloser is usually mounted to a pole or tower that suspends power lines above the ground. However, use with below ground systems is also known.

More particularly, reclosers are electromechanical devices, similar to circuit breakers. Reclosers are distributed at one or more locations along a power line, typically upline from a fuse. When a fault condition is detected by the recloser controller, the recloser will begin to timeout. In other words, the recloser controller will initiate a trip to open the recloser if the fault condition has not cleared itself during a fixed time interval, where the time interval is a function of current. Then, after a time delay, as the name suggests, the recloser will close, and if the fault condition has been cleared, power service is restored. If, however, the fault condition has not been cleared, the recloser controller will again trip open the recloser after a second fixed time interval. If, after a predetermined number of reclose operations, the fault condition has not been cleared, the recloser controller will permanently lockout the recloser (i.e., permanently open the circuit). The circuit then remains open until the system is repaired and/or the fault condition is eliminated.

Thus, a primary function of a recloser is to save fuses. In general, this is done by sensing the peak value of the current conducted and interrupting its flow by opening or tripping a recloser before a fuse blows. After an interval or time delay, the recloser closes, thereby restoring power to the system where it remains closed until the next fault is sensed.

The rate at which a fuse will blow and interrupt current is a function of the thermal heating of the fusible element. The rate of thermal heating is proportional to the power generated by the fault and each fuse has a time current characteristic which describes the time interval required to interrupt the fault current. The time interval is generally approximately inversely proportional to the value of the root mean square of the fault current. It is desirable to coordinate the recloser with the fuses to be saved to insure that the recloser in fact interrupts temporary fault currents before the fuses to be protected are blown. This is generally done by approximating the root mean square value of the fault current by sensing its peak value.

It must also be recognized that not all faults which occur on a power distribution line are temporary, such as those caused by a branch momentarily falling against the line. Some faults are of a more permanent nature such as those caused by a line falling to the ground. As a consequence, reclosers are built so that they will only trip a limited number of times within a short duration before locking open. Were this not done, a recloser would cycle until failure and many of the fuses to be protected would blow anyway.

At some magnitude of fault current it is desirable to have the recloser open immediately to protect the line rather than following an inverse time current characteristic. At intermediate levels it may be desirable from the power distribution standpoint to allow the fault current to flow for a limited period to allow the fault to burn itself open or blow the fuse. Many reclosers have alternate inverse time current characteristics which achieve this goal. Typically, a recloser will allow two shots or trip operations to follow a fast time current characteristic and two additional shots along a somewhat slower time current characteristic before locking open or out.

Conventional reclosers for three phase systems open all three phases at the same time upon detection of a fault on any one phase. Additionally, a recloser can partially trip. That is, the recloser trips only one phase or two phases of three phases, on a three phase electrical power line. For example, if a fault is detected on only one phase of a network distribution, the recloser will open on that phase only and leave the remaining phases operational. For a two phase fault, the recloser opens only those two phases where the fault occurs and leaves the remaining phases operational. This feature allows an electric utility to prevent unnecessary three phase power outages in their distribution networks when the interruption is only single phase or two phase.

However, when a recloser trips only a single phase or two phases, a current imbalance in the distribution network can result. This current imbalance in turn can cause higher neutral/ground currents. The increase in neutral/ground current could be overcurrent and can appear as a ground fault to the system. Overcurrent in the neutral/ground line results in a three phase trip. Therefore, it is desirable to prevent a three phase trip after a partial trip of a recloser because the design of a partial trip is to prevent a three phase trip.

Therefore, a need exists for apparatuses and methods for automatically adjusting the current threshold of a neutral/ground line after a partial trip, thereby preventing a three phase trip.

SUMMARY OF THE INVENTION

The present invention is directed to apparatuses and methods for preventing a three phase trip of a power line in a power distribution network delivering electrical power through a plurality of current carrying conductors and a neutral/ground line. The three phase trip is prevented after a change in the current in the neutral/ground line caused by a partial trip of a recloser.

In an exemplary method, a partial trip in the power distribution network is detected, and then a threshold current is automatically adjusted from a first level to a second level for the neutral/ground line. The threshold current represents the amount of current the neutral/ground line will draw before activating a three phase trip.

The above-listed features of the present invention will be more fully set forth hereinafter.

BRIEF DESCRIPTION OF THE DRAWINGS

Other features of the invention are further apparent from the following detailed description of the embodiments of the invention taken in conjunction with the accompanying drawings, of which.

DETAILED DESCRIPTION OF THE INVENTION

Figure 1:
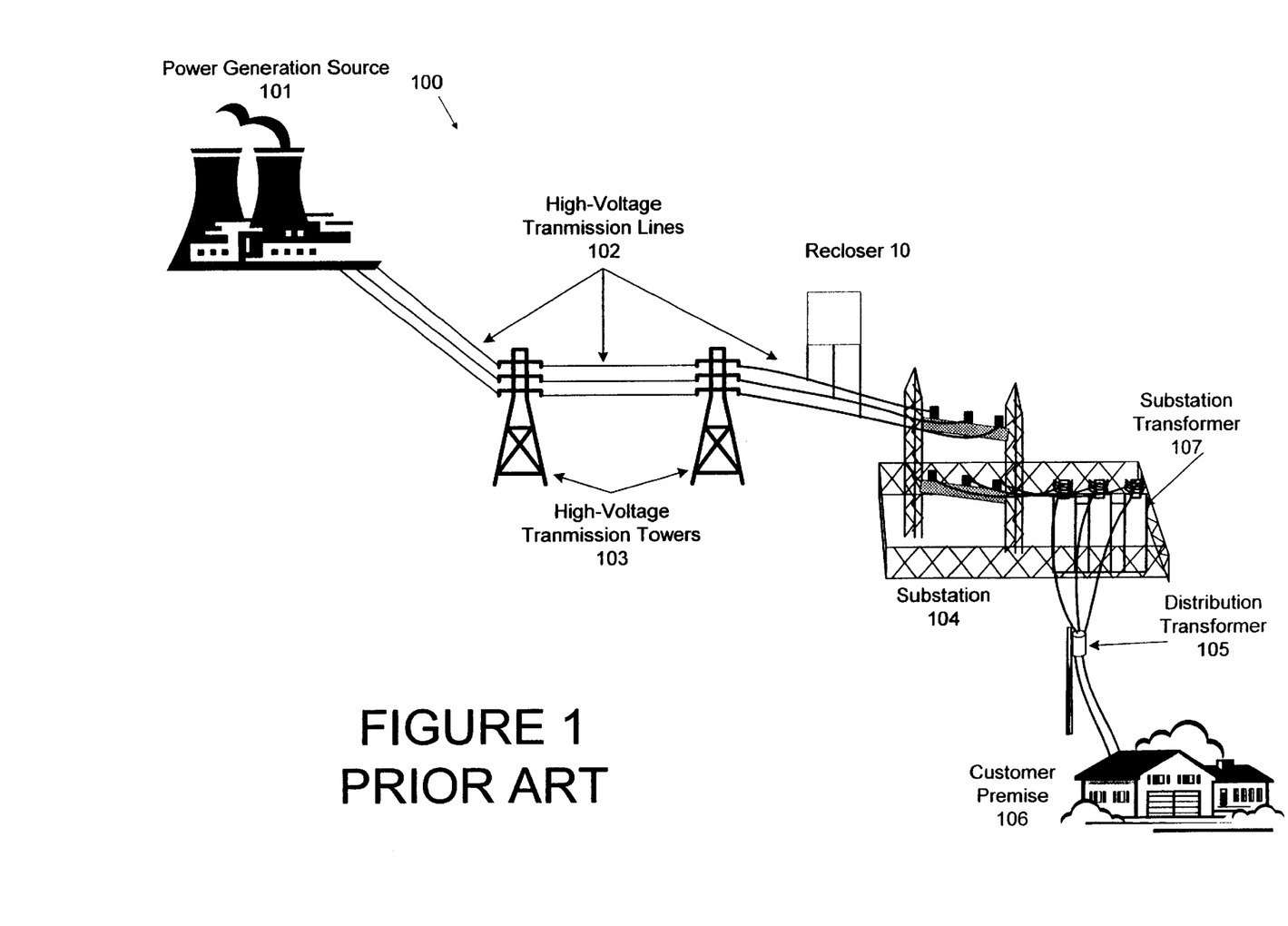
FIG. 1 is a schematic diagram of an electric power transmission system, as is well known in the art.

FIG. 1 is a schematic diagram an electric power transmission system 100. Generally, electric power transmission system 100 comprises three major components: generating facilities that produce the electric power, a transmission network that carries the electric power from the generation facilities to a distribution system, and the distribution system that delivers the electric power to the consumer.

More particularly, as shown in FIG. 1, a power generation source 101 is a facility that produces electric power. Power generation source 101 includes a generator (not shown) that creates the electrical power. The generator may be a large diesel engine or gas turbine, for example. Alternatively, the generator may be a steam turbine operated by burning coal, oil, natural gas, or a nuclear reactor. In each case, power generation source 101 provides three phase alternating current (AC) power. The AC power typically has a voltage of a few thousand volts.

A transmission substation (not shown) then increases the voltage from power generation source 101 to high-voltage levels for long distance transmission on high-voltage transmission lines 102. Typical voltages found on high-voltage transmission lines 102 range from about 69 to about 800 kilovolts (kV). High-voltage transmission lines 102 are supported by high-voltage transmission towers 103. High-voltage transmission towers 103 are large metal support structures attached to the earth, so as to provide a ground potential to system 100. High-voltage transmission lines 102 carry the electric power from power generation source 101 to a substation 104. A typical distance between power generation source 101 and substation 104 is approximately three hundred miles. High-voltage transmission lines 102 typically consist of four wires, three current-carrying conductors for each phase of the three phase AC power and one neutral conductor.

Generally, substations act as a distribution point in system 100 and a point at which voltages are stepped-down to reduced voltage levels. Substation 104 converts the power on high-voltage transmission lines 102 from transmission voltage levels to distribution voltage levels. In particular, substation 104 uses transformers 107 that step down the transmission voltages from their original levels (e.g., about 69 to about 800 kV) to distribution voltages that typically are less than about 10 kV. In addition, substation 104 may include an electrical bus (not shown) that serves to route the distribution level power in multiple directions. Furthermore, substation 104 often includes circuit breakers and switches (not shown) that permit substation 104 to be disconnected from high-voltage transmission lines 102 when a fault occurs on the lines.

Substation 104 typically is connected to a distribution transformer 105. Distribution transformer 105 may be an aerial transformer located atop a telephone or electric pole, or a pad-mounted transformer located on the ground, for example. Voltage levels between substation 104 and distribution transformer 105 typically are less than about 10 kV. Distribution transformer 105 steps-down the voltage to voltage levels required by a customer premise 106, for example. Such voltages typically range from about 240 volts to about 440 volts. Also, distribution transformer 105 may function to distribute one, two or all three phases of the three phase current to customer premise 106, depending upon the demands of the user.

Delivering power from the generation source 101 to the customer premise 106 is a difficult task. Oftentimes, faults and disturbances occur in the system and interrupt the delivery of power. A fault is a failure in the electrical delivery system. Typically, during a system disturbance, large increases in current will occur.

If, however, a recloser (such as recloser 10) is implemented in the system, during a system disturbance, the recloser will sense a current increase and will operate by opening and effectively cutting off current flow in order to protect the distribution system and its components. Since many fault conditions are temporary, a recloser is designed to close after a short period of time, thereby establishing normal current flow. For example, during a thunderstorm, if lightning were to strike the distribution system, the power to one's home may be disrupted for a few seconds causing lights and appliances to turn OFF (recloser opening), then ON (recloser closing). Once the recloser closes, if it senses the continued presence of increased current, it will again open. Such cycling between open and closed may occur three times before the recloser remains open.

It should be understood that the term "recloser", as used herein, covers various combinations of reclosers, sectionalizers, circuit breakers and the like, which may also be used within the scope of this invention.

Figure 2:
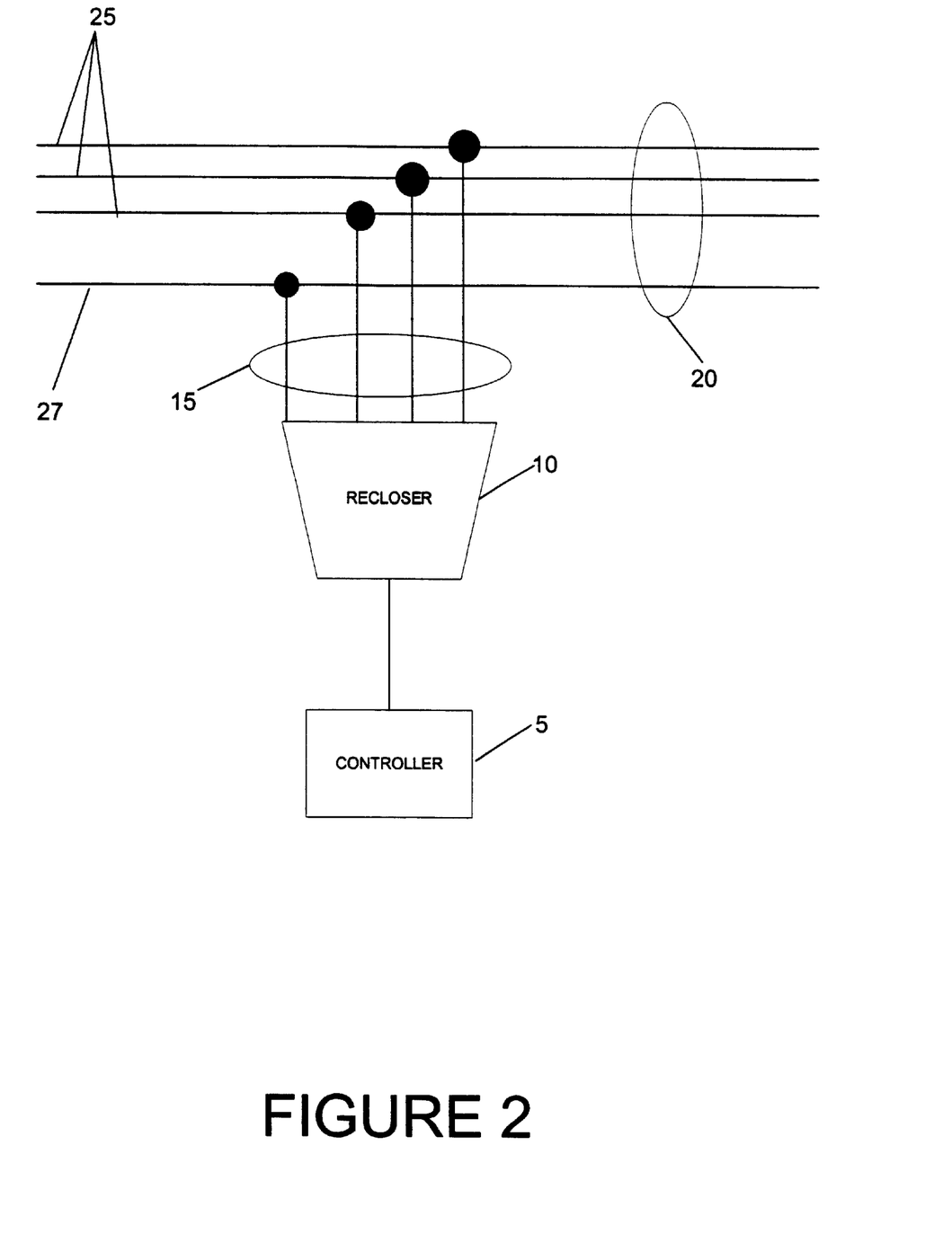
FIG. 2 is a schematic diagram of an exemplary recloser coupled to a three phase power line in which the present invention may be embodied.

FIG. 2 is a schematic diagram of an exemplary recloser coupled to a three phase power line in which the present invention may be embodied. With reference to FIG. 2, an exemplary recloser 10 is attached to a three phase power line, as shown. The recloser 10 comprises four poles 15. The power line 20 is a three phase power line with three power lines 25 each carrying a separate phase and a neutral or ground line 27. Three poles 15 are connected to an associated power line 25, thereby being energized by an associated phase. The fourth pole 15 is connected to the neutral or ground line 27. The recloser 10 is controlled by recloser controller 5.

The basic components of an automatic recloser 10 are a high-speed circuit breaker, overcurrent protection, trip logic, and automatic closing logic with an operation counter. When an overcurrent of sufficient magnitude (i.e., greater than a predetermined amount of current) flows through the recloser 10, the tripping action is initiated and a circuit interrupting contact within the affected pole(s) 15 opens with an operation counter advancing one count. After a preset time delay, the recloser contacts are automatically closed, thereby re-energizing the associated power line 25. If the fault persists, this tripping and reclosing sequence is repeated a predetermined number of times, as set by the controller 5, until a lockout function is initiated. If the fault was transient and cleared during any period when the recloser 10 was open, then the recloser 10 will remain closed after a short time delay, reset to its original condition ready for the next operation.

An exemplary recloser for use with the present invention is the VR-3S recloser manufactured and distributed by ABB Power T&D Company, Inc., Raleigh, N.C. Magnetic actuators open and close the recloser's main contacts.

More particularly, the recloser 10 is controlled by microprocessor-based controller 5 that contains software. There are two basic design areas that make up a microprocessor-based controller 5. The physical elements, such as integrated circuits, resistors, capacitors, displays, switches, and so forth, are called "hardware". Once constructed, they are not readily changeable. The second basic design area in the microcomputer includes computer programs and documentation. These elements are called "software" since they are readily changeable.

A microcomputer based on a microprocessor and associated memories and interfacing components is used in the recloser controller 5 to process input signals in a manner appropriate to the basic requirement for a recloser control. The microprocessor performs the various arithmetic and logic functions of the control. In particular, the required logic circuits as well as capabilities for servicing are typically included.

Memory is provided for temporarily and/or permanently storing data. In a recloser 10, for example, this information would include line current magnitudes. Read only memory (ROM) is preferably electrically programmable for easy modification and is used for storing programming information. In a recloser controller 5, for example, the memory module contains command information including multiple time-current characteristic curves.

An exemplary control unit is the PCD2000 power control device manufactured and distributed by ABB Power T&D Company, Inc., Raleigh, N.C. The control device can provide an interface for remote communication with SCADA systems using MODBUS RTU, MODBUS ASCII, and DNP 3.0 protocols. The controller can be programmed to implement other protocols. Ports are available for external links through a radio, modem, or direct fiber optic communications, for example.

Typical command information for a recloser controller includes first time current characteristics for phase and ground currents which usually result in the more rapid tripping of the recloser 10, and second time current characteristics for phase and ground currents which usually result in the recloser 10 remaining closed longer under fault conditions.

Figure 3:
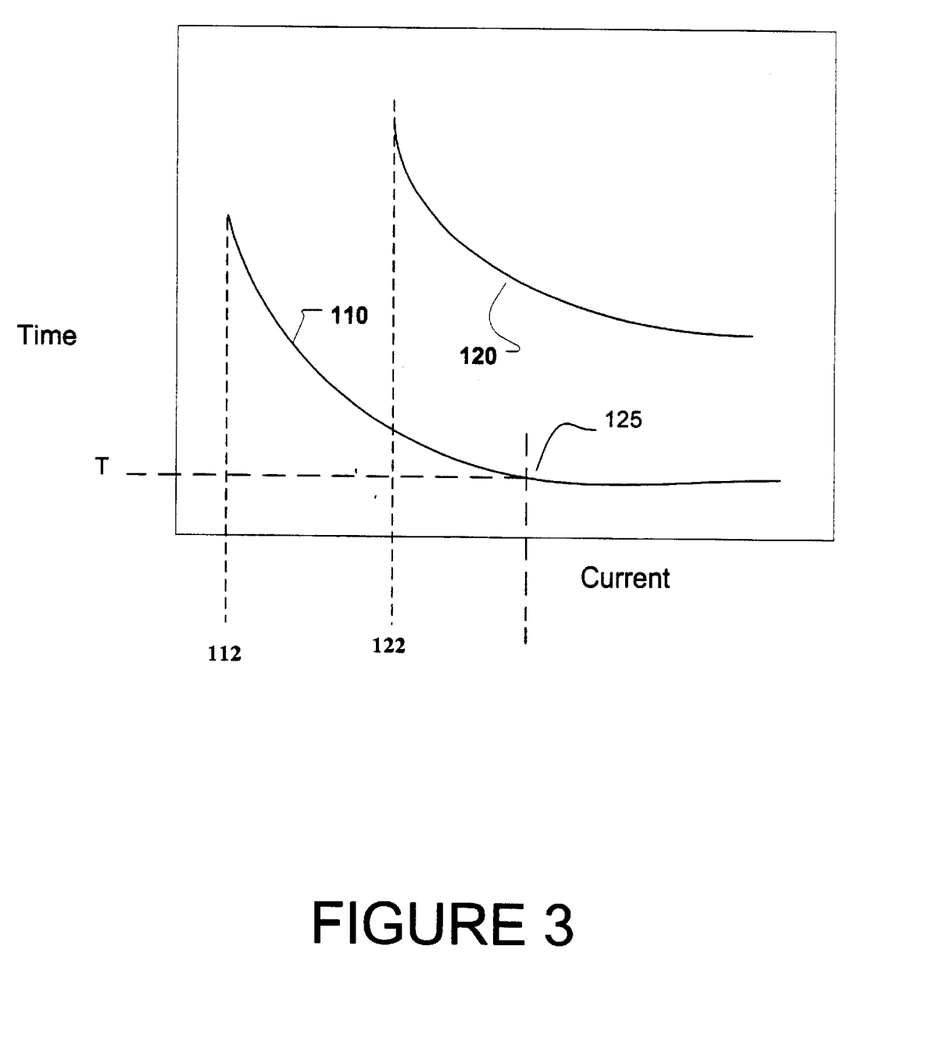
FIG. 3 is a graph showing time and current characteristics of an exemplary recloser in accordance with the present invention.

FIG. 3 is a graph showing time and current characteristics of an exemplary recloser. The characteristics shown are those that would typically be stored in a recloser controller. The two curves shown are the time and current characteristics of a neutral/ground line 110 (such as line 27 of FIG. 2) and the time and current characteristics of a phase line 120 (such as one of the lines 25 of FIG. 2). Typically, although not always, the time and current characteristics of the neutral phase are lower and thus more sensitive than the phase line. This is graphically illustrated by curve 110 being below curve 120.

Points 112 and 122 on their respective curves represent the amount of current at which the recloser will open the circuit and in what amount of time. Points 112 and 122 are commonly referred to as pickup points, i.e., the point at the least amount of current will trip the recloser. The pickup points are also commonly referred to as overcurrent and the terms may be used interchangeably herein. For example, if current I appears in a neutral line exhibiting the characteristics of curve 110, it will take time T for the recloser controller to open the circuit via the recloser.

In a partial trip of a recloser, each phase of the recloser is individually monitored (i.e., each line 25 is individually monitored) by the recloser controller and can be tripped through the protection elements on the phase that detects fault current (i.e., current above the pickup threshold level) to initiate a phase to trip open. In determining if a single phase is faulted, a protection element within the recloser detects a fault condition. The protection element enters pickup, then after predetermined time elapses, a trip operation results. It is possible to trip any and all phases that are in the pickup state at the time trip is determined.

In normal operation, the three phases (vectors) of power system sum to zero which result in zero current flowing through the ground or return line 27. However, a partial trip of a recloser often causes the lines of the system to become unbalanced. The line unbalance results in current being drawn through the neutral/ground line 27. The recloser controller 5 that is monitoring the system detects this unbalance but knows that this unbalance is the result of the partial (one or two phase) trip and not a ground fault. In order to prevent the ground line from subsequently erroneously tripping due to the load imbalance, in accordance with the invention, the recloser controller (and thus the recloser) automatically adjusts the threshold current at which the neutral/ground line will trip.

Figure 4:
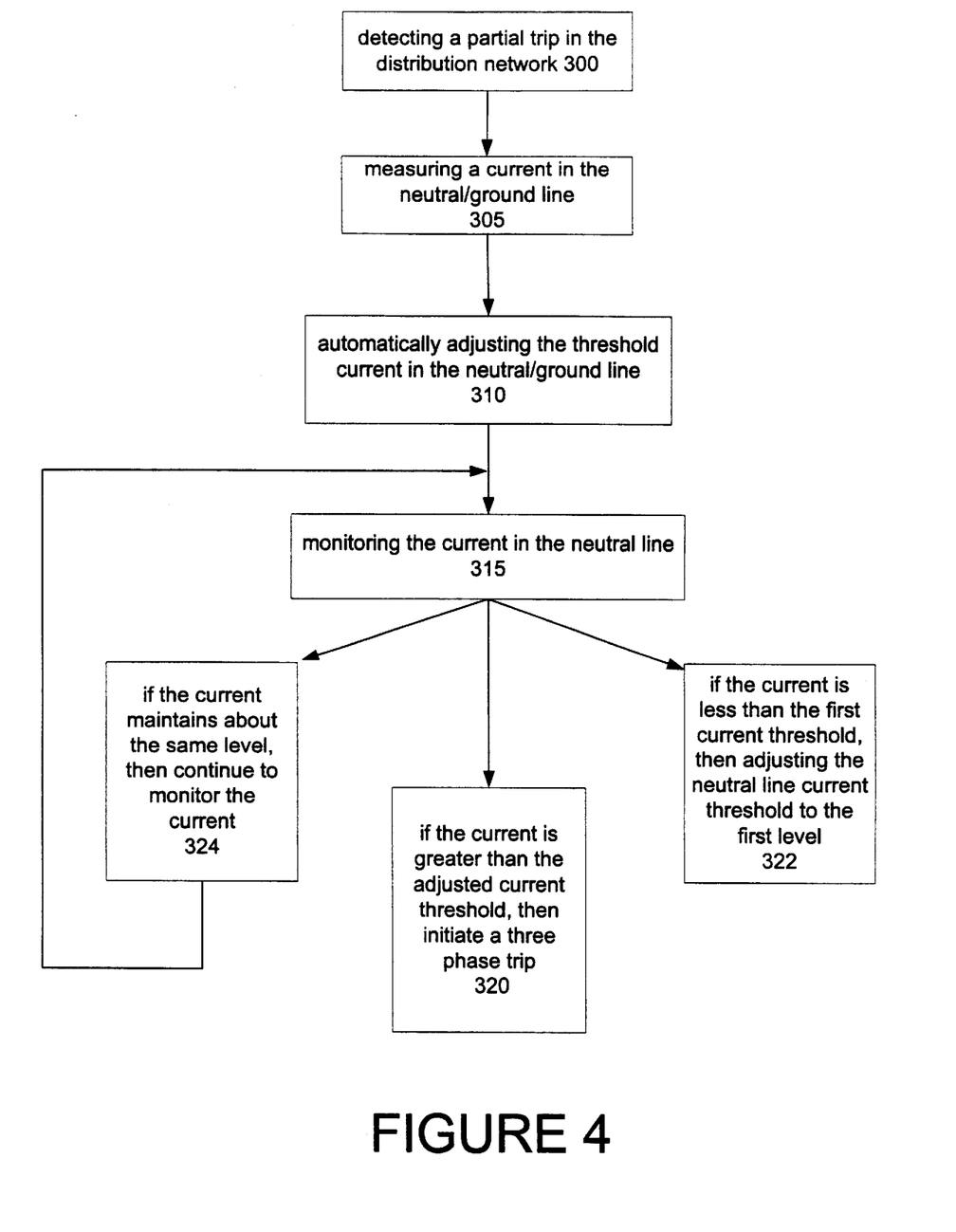
FIG. 4 is a flow diagram of an exemplary method of adjusting the current threshold of a neutral/ground line in accordance with the invention.

FIG. 4 is a flow diagram of an exemplary method of adjusting the current threshold of a neutral/ground line in accordance with the invention. First, at step 300, the recloser controller recognizes that the recloser has performed a partial trip. It should be noted that the recloser and recloser controller desirably recognize that a partial trip has occurred. This is so because, had a partial trip not occurred, then a variation in the current of the neutral line would likely mean that a fault occurred somewhere in the system and the recloser preferably trips in its normal manner, as described above.

After recognizing a partial trip, at step 305, the recloser controller measures the current that appears in the neutral/ ground line due to the load imbalance. The recloser controller, at step 310, automatically adjusts the current threshold of the neutral/ground line from a first current threshold level to a second current threshold level. The current measured at step 305 can be used in the determination of the threshold level.

Preferably, the second current threshold level of the neutral/current line is equal to the minimum operating point or pickup point of the phase line. In this manner, if the current in the neutral/ground line exceeds the minimum operating point of the phase line, then all three phases will trip according to its time and current characteristic curve.

After adjusting the current threshold, the recloser controller continuously monitors the current in the neutral line at step 315, and based on the status of the line, responds accordingly. More particularly, if the current in the neutral line exceeds the raised current threshold, then the recloser controller initiates a three phase trip, at step 320. Thus, a three phase trip can still occur. On the other hand, at step 322, if the current in the neutral line falls below the first current threshold level, then the recloser controller adjusts the current threshold current back to the first current threshold. Moreover, as represented by step 324, if the current in the neutral line maintains about the same level, then the recloser controller will continue to monitor the current in the neutral/ground line.

It is contemplated that adjusting the current threshold is implemented in the software of the recloser controller. However, the adjusting can be done from many other locations without departing from the spirit and scope of the invention.

Figure 5:
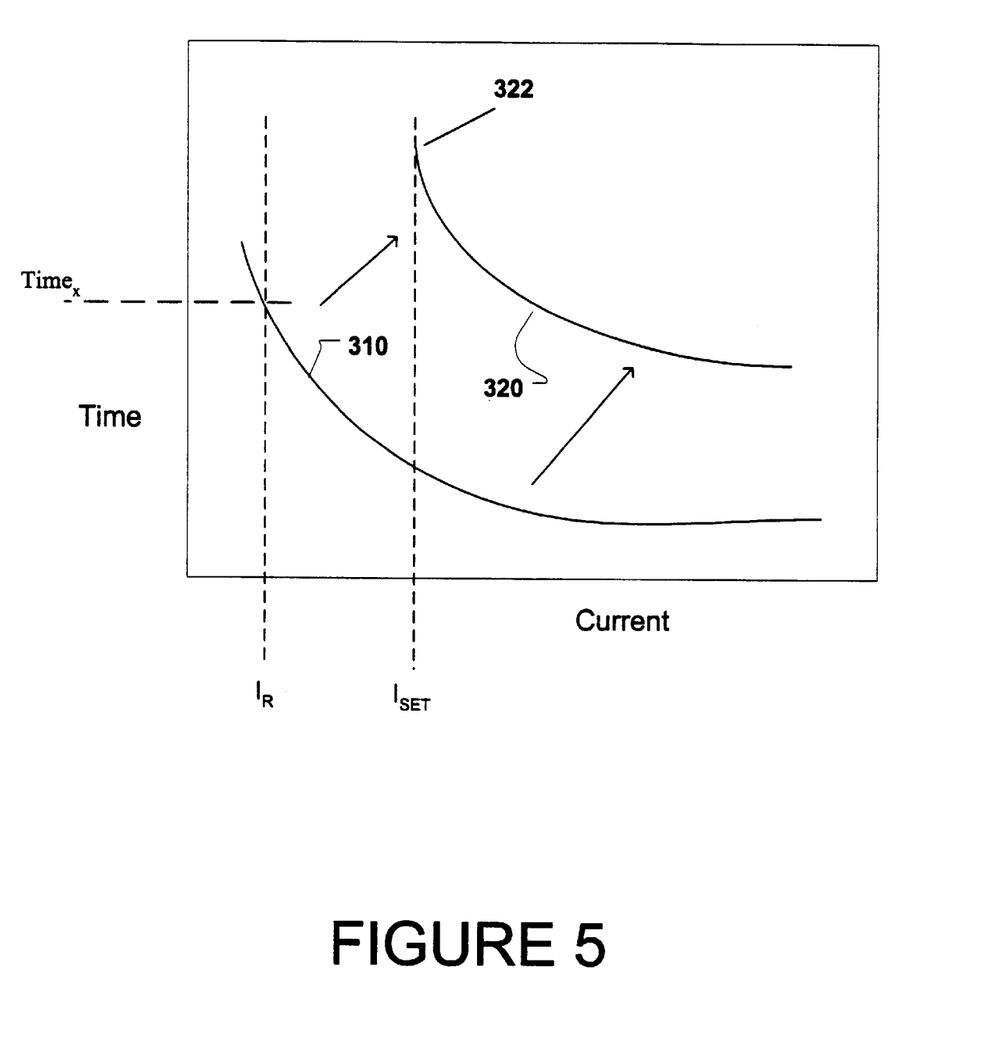
FIG. 5 is a graph showing further time and current characteristics of an exemplary recloser in accordance with the invention.

FIG. 5 is a graph showing further time and current characteristics of an exemplary recloser in accordance with the invention. Similar to curve 110 in FIG. 3, curve 310 represents the time and current characteristics of a neutral or ground line. Similar to curve 120 in FIG. 3, curve 320 represents the time and current characteristics of one of the phase lines. In operation, after a partial trip occurs (single or two phase), a current $I_R$ appears in the neutral line. Conventionally, once current $I_R$ appears in the neutral line, the line would trip in time$_x$. However, in accordance with the present invention, once the current $I_R$ is detected by the recloser controller, the threshold current is automatically raised to a new level, e.g., $I_{SET}$, responsive to the increase in the current in the neutral/ground line. Consequently, the neutral line will not trip until the current in the neutral line, $I_R$, reaches $I_{SET}$. Thus, a three phase trip is prevented because the recloser controller reacted to a change in the neutral line current due to a partial trip of a recloser and adjusted the current threshold. Had the recloser controller not adjusted the current threshold in neutral line, and $I_R$ exceeded the threshold current, a three phase trip would occur.

As shown, $I_{SET}$ is the same as the minimum operating point 322 of the phase line represented by curve 320. Graphically speaking, once the partial trip is detected and $I_R$ appears in the neutral line, if $I_{SET}$ is set to the minimum operating point of curve 320, as is shown in FIG. 5, it is as if the curve 310 is shifted to curve 320. In other words, the time and current characteristics of the neutral line will be the same as the time and current characteristics of the phase line, in accordance with an exemplary embodiment.

It is appreciated that the adjusted current threshold, $I_{SET}$, can be adjusted to any level. As stated earlier, in one embodiment of the invention, the adjusted current threshold can be set to the minimum operating point of curve 320. However, $I_{SET}$ can be set below or above the minimum operating point of curve 320.

Figure 6:
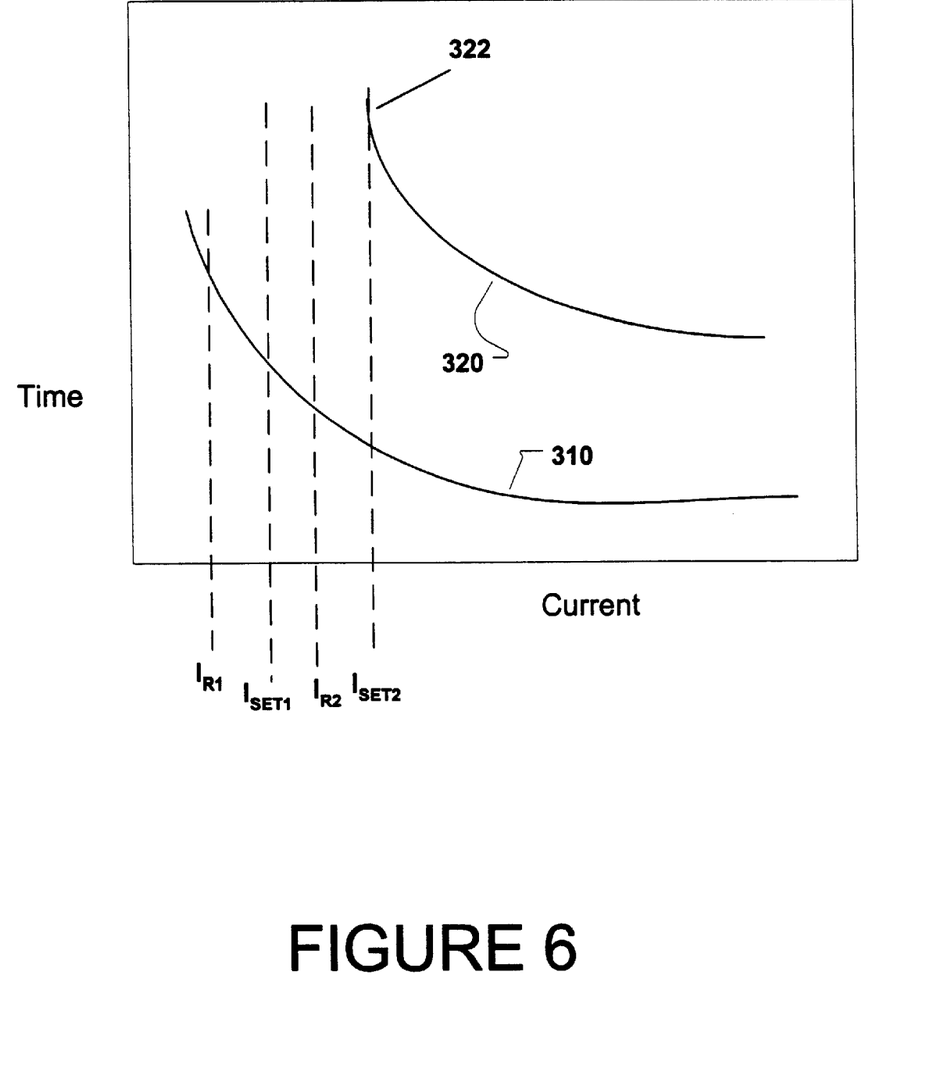
FIG. 6 is a graph showing additional time and current characteristics of an exemplary recloser in accordance with the invention.

In another embodiment of the invention, instead of initiating a three phase trip when the current in the neutral/ground line exceeds the adjusted current threshold, the current threshold is adjusted to another level. In this manner, the current threshold may be adjusted several times before the current threshold reaches the current threshold of the phase line (e.g., the phase line represented by curve 320). FIG. 6 illustrates this situation.

FIG. 6 is a graph showing additional time and current characteristics of an exemplary recloser in accordance with the invention. In FIG. 6, $I_{SET1}$ is adjusted to a level that is below the minimum operating point 322 of curve 320 after the detection of an initial current $I_{R1}$ in the neutral line. Consequently, if $I_{R2}$ appears in the neutral line after the adjusted current threshold has been set to $I_{SET1}$, in accordance with another embodiment of the invention, the recloser controller will again adjust the current threshold to level $I_{SET2}$. This again prevents a three phase trip because, had the current threshold not been raised to level $I_{SET2}$ then, all three phases would trip as a result of the line current exceeding the threshold current.

It is appreciated that the current threshold whether it be the first current threshold level or the adjusted current threshold level may be set by any party whether it be the operator of utility lines or the manufacturer of the recloser controller without departing from the scope of the invention. Additionally, it is appreciated that the adjusting of the current threshold may be done on-line or off-line without departing from the scope of the invention.

It is also appreciated that other conditions, other than overcurrent, may trip a recloser in accordance with the invention. Such as, for example, a variance in voltage, frequency or the like may also occur and trip a recloser in accordance with the invention without departing from the scope of the invention.

Although exemplary embodiments of the invention has been described in detail above, those skilled in the art will readily appreciate that many additional modifications are possible in the exemplary embodiments without departing from the novel teachings and advantages of the invention. Accordingly, these and all such modifications are intended to be included within the scope of this invention as defined in the following claims.

What is claimed is:

1. A method of preventing a three phase trip of a power line in a power distribution network delivering electrical power through a plurality of current carrying conductors and a neutral/ground line, comprising:

detecting a partial trip in the power distribution network, the partial trip corresponding to one of a one phase trip and a two phase trip;

measuring the current in the neutral/ground line after detecting the partial trip; and adjusting a threshold current from a first level to a second level responsive to the measured current in the neutral/ground line, the threshold current indicative of the current amount where the neutral/ground line will trip.

2. The method of claim 1, further comprising:

monitoring the current in the neutral/ground line after adjusting the threshold current;

if the current in the neutral line is greater than the threshold current then initiating a three phase trip;

if the current in the neutral line is below the first level then adjusting the threshold current to the first level; and if the current in the neutral line maintains about the same level then continuing monitoring the current in the neutral line.

3. The method of claim 1, wherein the first level is lower than the second level.

4. The method of claim 1, wherein the second level corresponds to a minimum operating point of a phase line, the minimum operating point of the phase line being the point at which the least amount of current causes a phase line trip.

5. The method of claim 4, wherein the second level is less than the minimum operating point of the phase line.

6. A computer-readable medium encoded with computer-executable instructions to perform the method of claim 1.

7. The medium of claim 6, further comprising computer-executable instructions to monitor the current in the neutral/ground line after adjusting the threshold current; wherein:

if the current in the neutral line is greater than the threshold current then initiating a three phase trip;

if the current in the neutral line is below the first level then adjusting the threshold current to the first level; and if the current in the neutral line maintains about the same level then continuing monitoring the current in the neutral line.

8. The medium of claim 6, wherein the first level is lower than the second level.

9. The medium of claim 6, wherein the second level corresponds to a minimum operating point of a phase line, the minimum operating point of the phase line being the point at which the least amount of current causes a phase line trip.

10. The medium of claim 6, wherein the second level is less than the minimum operating point of the phase line.

11. A system for preventing a three phase trip of a power line in a power distribution network delivering electrical power through a plurality of current carrying conductors and a neutral/ground line, comprising:

a recloser connected to at least one of the phase lines of the electrical system; and a recloser controller connected to the recloser, and adapted to detect a partial trip in the power distribution network, the partial trip corresponding to a one phase trip or a two phase trip, adapted to measure the current in the neutral/ground line after detecting the partial trip, and adapted to adjust a threshold current from a first level to a second level responsive to the measured current in the neutral/ground line, the treshold current indicative of the current amount the neutral/ground line can carry before a trip will result.

12. The system of claim 11, wherein the controller is adapted to monitor the current in the neutral/ground line after adjusting the threshold current; and if the current in the neutral line is greater than the threshold current then initiating a three phase trip;

if the current in the neutral line is below the first level then adjusting the threshold current to the first level; and if the current in the neutral line maintains about the same level then continuing monitoring the current in the neutral line.

13. The system of claim 11, wherein the first level is lower than the second level.

14. The system of claim 11, wherein the second level corresponds to a minimum operating point of a phase line, the minimum operating point of the phase line being the point at which the least amount of current causes a phase line trip.

15. A recloser controller connected to a recloser in a power distribution network delivering electrical power through a plurality of current carrying conductors and a neutral/ground line, comprising:

a microprocessor for receiving data from and transmitting data to, via an interface, the recloser; and a a memory for storing the data, wherein the recloser controller is adapted to detect a partial trip in the power distribution network, the partial trip corresponding to a one phase trip or a two phase trip, adapted to measure the current in the neutral/ground line after detecting the partial trip, and adapted to adjust a threshold current from a first level to a second level responsive to the measured current in the neutral/ground line, the threshold current indicative of a current amount the neutral/ground line can carry before a trip will result.

16. The recloser controller of claim 15, wherein the controller is adapted to monitor the current in the neutral/ground line after adjusting the threshold current; and if the current in the neutral line is greater than the threshold current then initiating a three phase trip;

if the current in the neutral line is below the first level then adjusting the threshold current to the first level; and if the current in the neutral line maintains about the same level then continuing monitoring the current in the neutral line.

17. The recloser controller of claim 15, wherein the first level is lower than the second level.

18. The recloser controller of claim 15, wherein the second level corresponds to a minimum operating point of a phase line, the minimum operating point of the phase line being the point at which the least amount of current causes a phase line trip.

* * * * *